United States Patent
Liyanage et al.

(10) Patent No.: US 9,495,320 B2
(45) Date of Patent: Nov. 15, 2016

(54) REMOVING UPSTREAM DEAD CYCLES IN A DATA COMMUNICATIONS BUS

(75) Inventors: Ruchira K. Liyanage, Folsom, CA (US); Kai Chen, Philadelphia, PA (US); Hem Doshi, Folsom, CA (US); Michael J. Norris, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 13/976,941

(22) PCT Filed: Dec. 22, 2011

(86) PCT No.: PCT/IB2011/003346
§ 371 (c)(1),
(2), (4) Date: Jun. 2, 2015

(65) Prior Publication Data
US 2015/0286603 A1    Oct. 8, 2015

(51) Int. Cl.
*G06F 13/42* (2006.01)
*G06F 1/10* (2006.01)
*G06F 9/30* (2006.01)
*G06F 11/07* (2006.01)

(52) U.S. Cl.
CPC ............. *G06F 13/4221* (2013.01); *G06F 1/10* (2013.01); *G06F 9/30* (2013.01); *G06F 11/07* (2013.01)

(58) Field of Classification Search
CPC ........ G06F 13/4221; G06F 1/10; G06F 9/30; G06F 1/08; G06F 11/07
See application file for complete search history.

(56) References Cited

U.S. PATENT DOCUMENTS

| | | | |
|---|---|---|---|
| 6,850,523 B1* | 2/2005 | Karr ...................... | H04L 29/06 370/389 |
| 7,236,553 B1* | 6/2007 | Choi ..................... | H04L 7/0008 375/325 |
| 2011/0246686 A1* | 10/2011 | Cavanagh, Jr. ......... | G06F 13/28 710/22 |
| 2012/0023368 A1* | 1/2012 | Blackmon ............. | G06F 11/141 714/16 |
| 2013/0283085 A1* | 10/2013 | Venkatraman ............ | G06F 1/10 713/503 |

* cited by examiner

*Primary Examiner* — Henry Tsai
*Assistant Examiner* — Christopher A Daley
(74) *Attorney, Agent, or Firm* — Blakely, Sokoloff, Taylor & Zafman LLP

(57) ABSTRACT

Dead cycles are removed from an upstream side of a data communications bus. In one example, data symbols are received on clock cycles from lanes of a peripheral device bus having dead cycles. The data symbols are sent upstream on the clock cycles. The start of a packet in the received data symbols is detected and the sending of the data symbols is stalled before sending the start of the packet until additional cycles of data are written into a buffer. Logical idle symbols are sent upstream in place of the data during the stalling. The start of the packet sent after the additional cycles of data are read into the buffer. When a dead cycle is detected during the packet, then a buffered cycle of data is sent upstream during the dead cycle.

20 Claims, 5 Drawing Sheets

US 9,495,320 B2

REMOVING UPSTREAM DEAD CYCLES IN A DATA COMMUNICATIONS BUS

CROSS-REFERENCE TO RELATED APPLICATION

This patent application is a U.S. National Phase Application under 35U.S.C. §371 of International Application No. PCT/US2011/066984, filed Dec. 22, 2011, entitled "REMOVING UPSTREAM DEAD CYCLES IN A DATA COMMUNICATIONS BUS".

TECHNICAL FIELD

The present disclosure relates to the field of data communications bus interfaces and, in particular, to compensating for dead cycles in a data signal.

BACKGROUND

The specification for the PCIe Gen3 (Peripheral Component Interconnect Express, third generation starting with version 3.0) protocol introduces 128-to-130 bit encoding. A serial stream has TLPs (Transaction Layer Packets), DLLPs (Data Link Layer Packets) and SKIP OS' (Ordered Sets) with a 2-bit sync-header followed by a 128 bit data pattern. The sync header can be either 01 or 10. The sync-header indicates to a PCIe receiver whether the following 128-bits are a data block or an ordered set. Before the receiver's link layer processes incoming TLPs, the sync headers are stripped out.

The upstream PHY layer has a serial to parallel converter which converts the incoming 1b@8GT/s data stream into an 8b@1GT/s parallel path for easier management. However, stripping out these 2 bit sync headers every 16 cycles of the 1 GHz clock, creates an upstream dead cycle (a cycle with no data) after every 64 cycles of the 1 GHz clock of data. The dead cycles can occur in the middle of a TLP when the link layer is processing incoming data. This can disrupt the processing of the TLP and lead to errors in the results.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In order to tolerate the dead cycles, a special hardware block can be placed between the PHY layer and the link layer. The special hardware upstream dead cycle remover (UDR) buffers the upstream data from the PHY layer before presenting TLPs to the link layer. The special hardware block absorbs the dead-cycles that come in the middle of the TLPs by releasing the buffered data to the link layer in that cycle. At every TLP boundary, the buffer is replenished. The buffer therefore contains enough data to absorb the maximum number of dead-cycles that can happen in the middle of the longest possible TLP. In between TLPs, logical idle tokens are presented to the upstream link layer while the buffer is being replenished.

The special hardware block acts as glue logic between the new PHY layer designed to support the new demands of the PCIe Gen3 protocol and the previous generation link layers. The new block significantly reduces changes in the link layer that might otherwise be required to support PCI Gen3.

Figure 1:
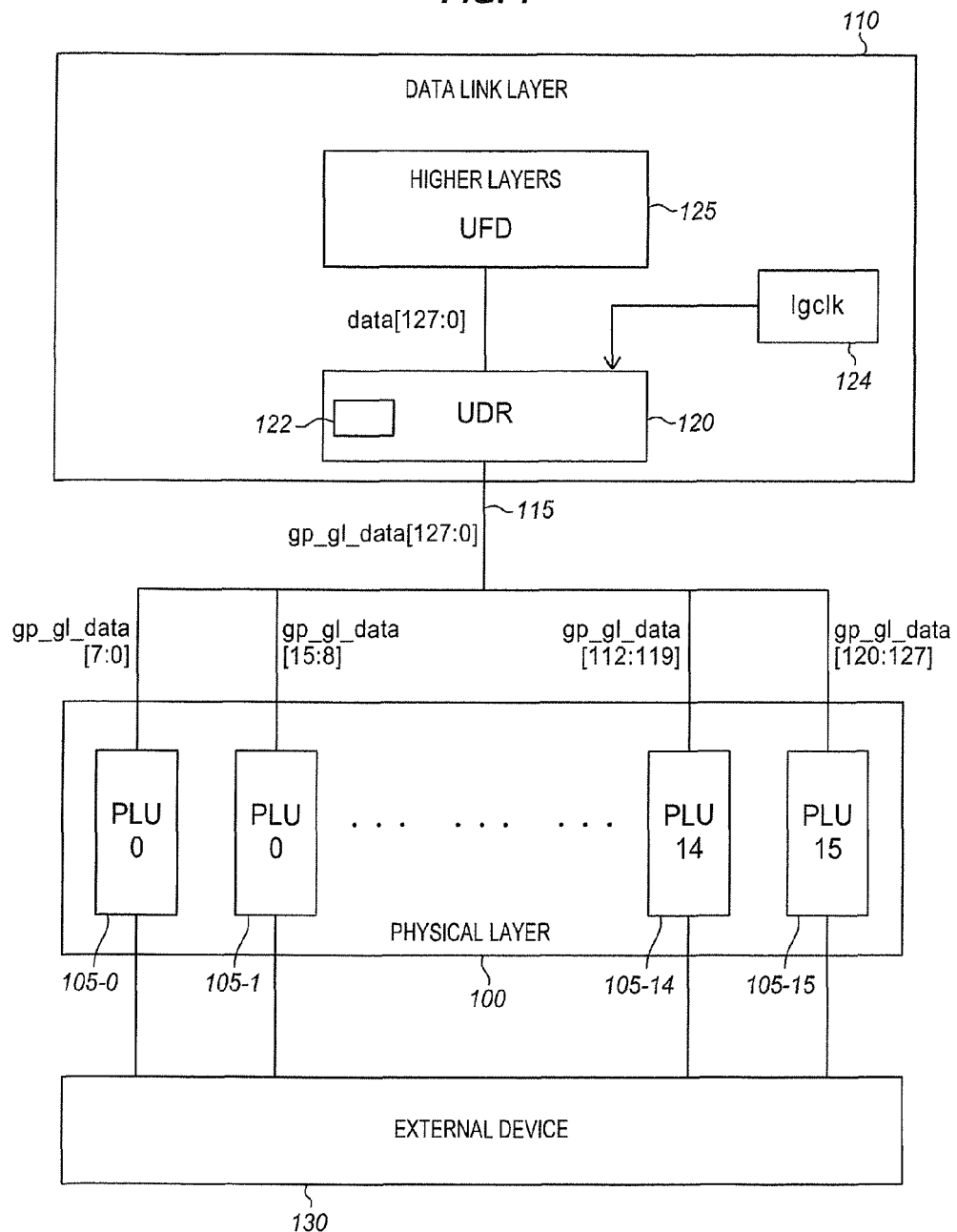
FIG. 1 is block diagram of a physical layer and a data link layer of a data communications bus according to an embodiment of the invention.

FIG. 1 shows a physical layer PHY 100 and a data link layer 110. Data is received on one or more of 16 physical lane units (PLU) from a PCIe interface to an external device 130. The external device may be any of a variety of different peripheral devices, such as graphics, sound, storage, and input devices. Alternatively, the interface may be to a computing device and the illustrated PHY is a part of such a peripheral device. PCIe is specified to operate with 1, 2, 4, 8, 12, 16, or 32 lanes and 16 lanes are shown, however any number of lanes may be used with the embodiments described herein. The described embodiments may also be used with other communications interfaces which may have more or fewer lanes.

The data from each physical lane is combined into a single data input stream 115 into the data link layer 110. The data link layer tracks the state of the PHY. It communicates the status of the link with higher layers and manages the link through the PHY.

A new intermediate block 120 is presented between the PHY 100 and basic components of the data link layer 110. In the illustrated example, the intermediate block is between the PHY 100 and an Upstream Frame Decoder (UFD) block 125 of the data link layer. The UFD passes data to higher layers, such as transaction layers and application layers. This new block serves as an upstream dead cycle remover, or UDR 120. The UDR shields the link layer from seeing any dead cycles in the middle of a packet transmission, in the case of PCIe the packet is a TLP. The UDR achieves this by absorbing the dead cycles during a packet transmission through a buffer structure 122, and re-inserting these dead cycles back after the whole packet is received in the Link Layer. The UDR is regulated by a logical clock 124 that time the input and output of data bytes or symbols received from the PHY.

The UDR may buffer enough data from the PHY so that whenever a dead cycle happens in the middle of a packet transmission, instead of sending the dead cycle to the link layer, the UDR replaces it with buffered data. At the end of the packet, the UDR refills this buffer and at the same time sends Logical IDLE (LIDL) symbols upstream. Sending these LIDLs upstream allows the UDR to refill its buffers. The buffers may be arranged to always delay the data by a specific predetermined number of cycles.

Figure 2:
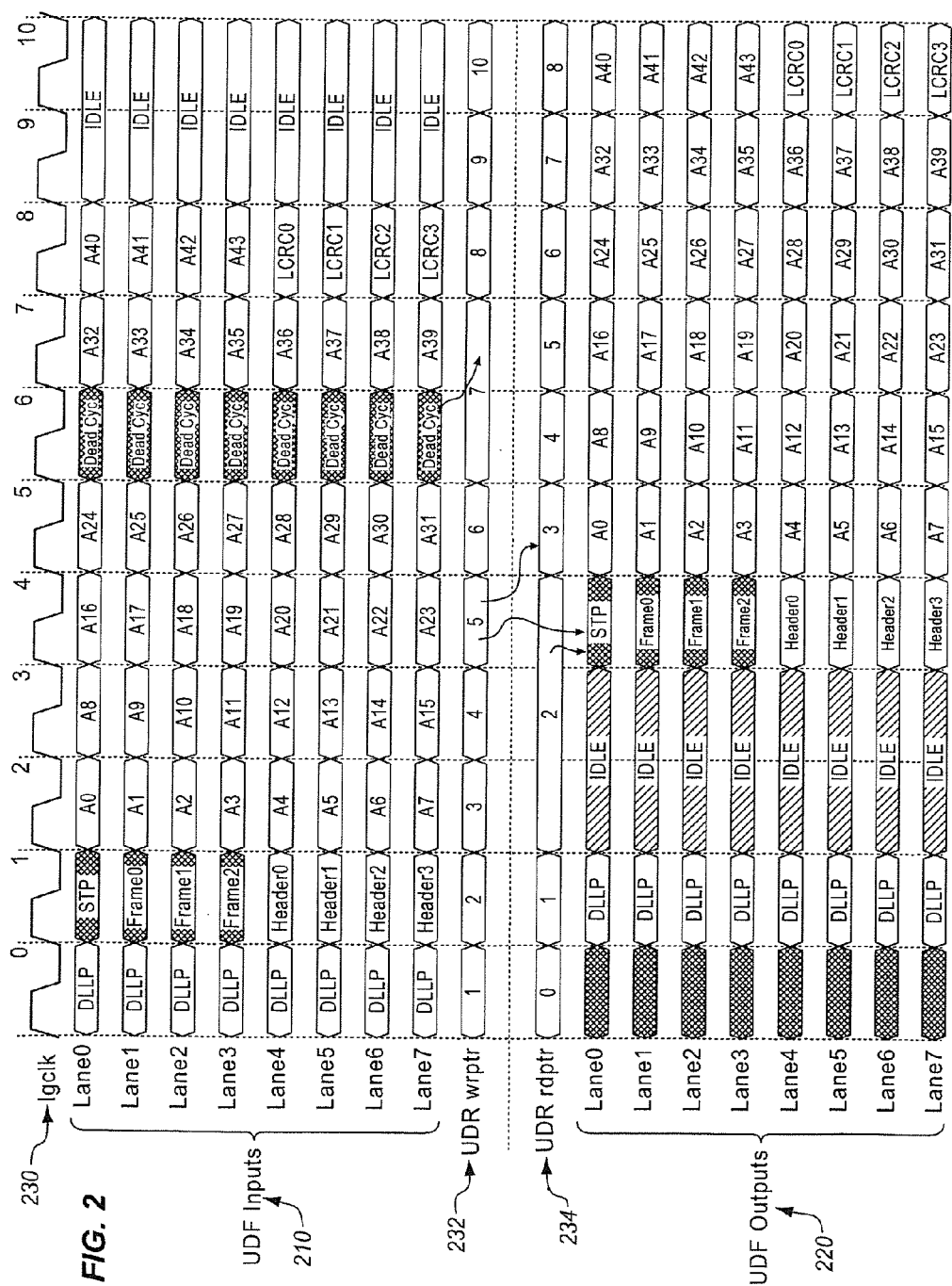
FIG. 2 is timing diagram of data flow including the removal of upstream dead cycles according to an embodiment of the invention.

FIG. 2 shows a diagram of a data flow using the buffer 122 in one example of using the UDR. In FIG. 2, data received by the UDR is shown as UDR input 210. This data will be loaded into the buffer 122 and then released based on the logical clock 124. The data produced by the UDR from the buffer to the UFD is shown as UDR output 220. The data is shown as eight rows of data, one for each of eight lanes or physical lane units, received for a duration of 10 clock cycles as indicated by a logical clock 230. Cycles are shown as columns. While eight lanes are shown there may be more or fewer depending on the particular implementation. The UDR input 210 is accompanied by a UDR write pointer row, wrptr, 232 and the UDR output 220 is accompanied by a read pointer row, rdptr, 234. These pointer rows are also aligned with the clock row 230.

A simple example of the operation of the UDR to absorb dead cycles in a x8 Link is shown in the diagram. In this example, a DLLP (Data Link Layer Packet) is completing on cycle 0, corresponding to wrptr 1 and is immediately followed by a TLP (Transaction Layer Packet) that is written into entry 2 of the UDR buffer on cycle 1. The TLP begins with an STP (Start of TLP) symbol, framing headers and then data symbols A0 to the end, in this case A43. The TLP ends with LCRC (link cyclic redundancy check) symbols as the end symbols. The LCRC occurs at cycle 8 and then the input is idle for some number of cycles.

When the UDR reads the data on cycle 1 when the rdptr is 2, it detects, based on the STP symbols, that the data is the start of a TLP. As a result, the UDR stalls the rdptr until enough data has been written into the UDR buffer, in this case for 2 additional cycles. 4 cycles of data is enough data in the illustrated example. How much data is enough date depends upon how many dead cycles might occur during a TLP. This will depend on the maximum payload size configuration done by the device driver.

While the rdptr 234 is stalled, logical idle symbols are sent upstream in place of the data. The rdptr continues to stall until the rdptr and wrptr separation is 3, representing that 4 cycles of data have been stored in the UDR buffer 122. This happens on cycle 4 when the wrptr is 5 and the rdptr is 2. At this point, the TLP is released from the UDR 120 and sent upstream to the UFD 125.

On cycle 6, a dead cycle appears at the UDR input. In the illustrated example, the dead cycle is between data symbol A31 and A32. The wrptr is then stalled at 7, and the dead cycle is not written into the UDR buffer. The wrptr resumes incrementing on cycle 7 when UDR receives the next eight bytes of the TLP. There are eight bytes for this eight lane or x8 PCIe interface, however there may be more or fewer bytes, depending upon the number of lanes in use. Notice that the wrptr and rdptr separation is reduced from 3 to 2 on cycle 7 because of the dead cycle.

The separation between the write pointer 232 and the read pointer 234 is reduced every time a dead cycle appears at the input of the UDR and interrupts a TLP transmission. Accordingly, the UDR buffer stores enough data to make sure that the read pointer does not catch up with the write pointer and cause an underflow.

Notice that the UDR output 220 shows a continuous TLP packet without any dead cycles in between. Instead there are dead cycles between the DLLP and the TLP. Depending upon the data sequence the dead cycles may alternatively be inserted between two different TLPs or between a TLP and a DLLP or between a DLLP and a TLP. This is achieved by having buffered enough data at the beginning of the TLP or DLLP. Any dead cycle that shows up at the UDR inputs will be replaced with the already buffered data. When the next TLP comes, the UDR Buffer is refilled to store enough data again. In other words, the UDR transfers the dead cycles in the middle of the TLP to the start of the TLP.

Figure 3:
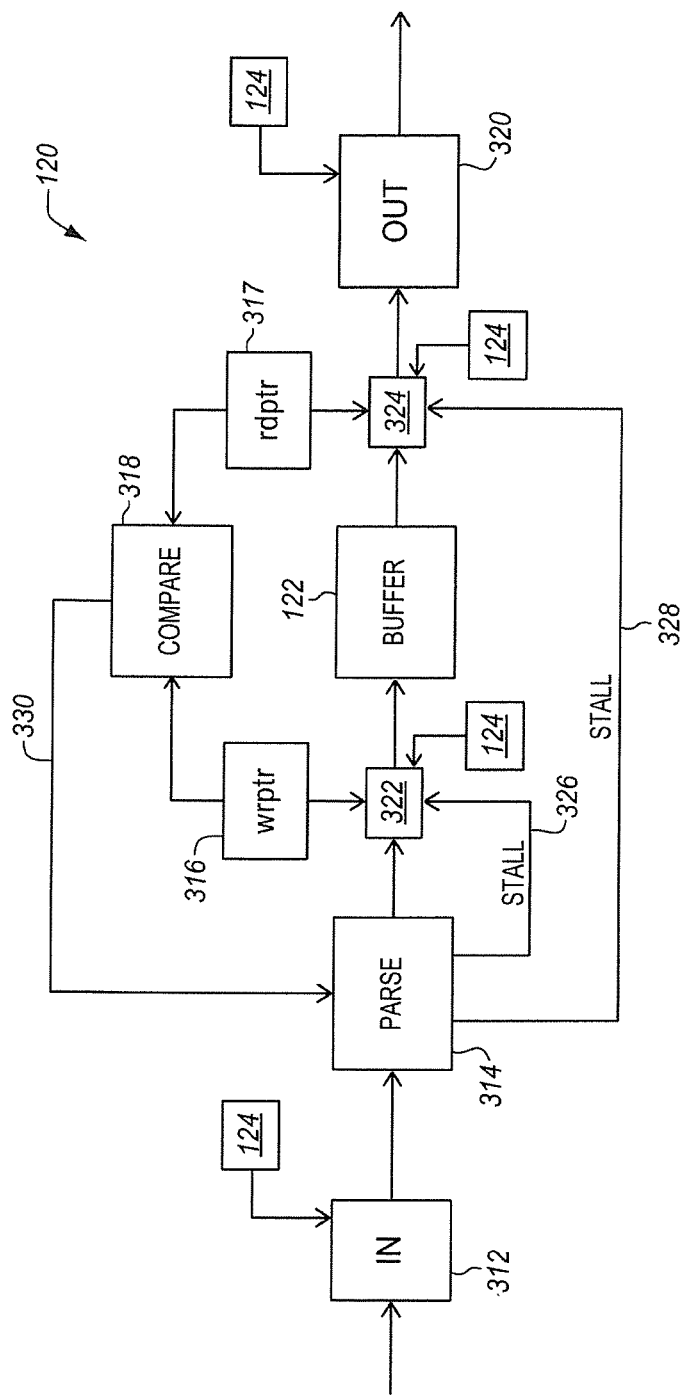
FIG. 3 is functional block diagram dead cycle removal according to an embodiment of the invention.

FIG. 3 is a functional block diagram of the UDR 120 in more detail. Data is received from the PLUs 105 at an input interface 312 as sequential bytes. The input interface is clocked by the logic clock, lgclk 124, shown also in FIG. 1. The bytes are sent to a symbol parser 314 to determine whether the bytes are packet symbols, idle symbols, dead cycles, etc. After parsing, the symbols pass through a gate 322 to be clocked into the buffer 122. The buffer may have address, gate, and clock logic (not shown) depending on the particular implementation.

Each symbol written into the buffer is counted by a write pointer 316. The write pointer stores the current count and may be a part of the buffer, a part of the parser or a part of the gate. In the example of FIG. 3, the write pointer is shown as a register that tracks the current write pointer count. This value corresponds to the values in the row indicated by 232 in FIG. 2.

Similarly, each symbol written out of the buffer 317 is written out through a gate 324 under the control of the clock 124 input. From the gate, the bytes are sent to upstream components through a clocked output interface 320 the clock may be the same or different from the clock used by the input interface 312. At the read out pass gate 324, a read pointer register 317 tracks the read pointer count as each symbol is clocked out of the buffer.

The parser 314 determines at least two things by parsing the received symbols in order to support the functionality shown in FIG. 2. First, the parser determines whether a received symbol is an empty or dead cycle symbol. If so then the parser generates a stall signal 326. This signal is indicated as going to the input pass gate 322 where it can be used to stall the input gate 312 and stop the writing of bytes into the buffer 122. The particular routing of the stall signal may be modified, depending on the particular implementation. The stall signal is asserted as long as the parser sees dead cycles. In the PCIe example described above, dead cycles are sent in isolation, therefore there will only be one dead cycle in the sequence of cycles. However, the invention is not so limited. When the parser sees data symbols again, then the stall signal may be de-asserted and the data symbols are written into the buffer. While the stall signal is asserted, the write pointer 316 is not incremented because there have been no write operations.

The parser 314 also determines when a received symbol corresponds to the start of a packet. In the example of FIG. 2, the packet is a TLP that begins with an STP symbol, however, the invention is not so limited. Upon parsing this symbol, the parser may generate a second stall signal 328 to the read pass gate 324 or the read pointer 317. This stall signal stalls the reads from the buffer until the writes into the buffer have established an adequate margin for the dead cycle stalls.

The write pointer 316 and the read pointer 317 are coupled to a comparator 318. The comparator may be a part of the parser or of the pass gates, or of some other device, depending on the implementation. The comparator allows the values of the two registers to be compared. When the write pointer is some predefined number of clock cycles ahead of the read pointer, then the comparator sends a good signal 330 to the parser and the parser may de-assert the stall signal to the write gate. This ensures that the write pointer has enough data buffered at the start of the packet to eliminate the dead cycles. In the examples above, the predefined number is three, however, the best number of clock cycles or write cycles implements depends on the particular implementation.

The comparator and its function may be removed from the system. In such a configuration, the parser may simply stall the writes for two or three cycles each time an STP symbol is detected. This will ensure that there is always enough data in the buffer to eliminate the dead cycles. While this approach simplifies the system considerably, it allows the read pointer to advance far ahead of the write pointer in those cases when there are no dead cycles in a packet. This may require a larger buffer and eventually, it may become necessary to flush the buffer.

Figure 4:
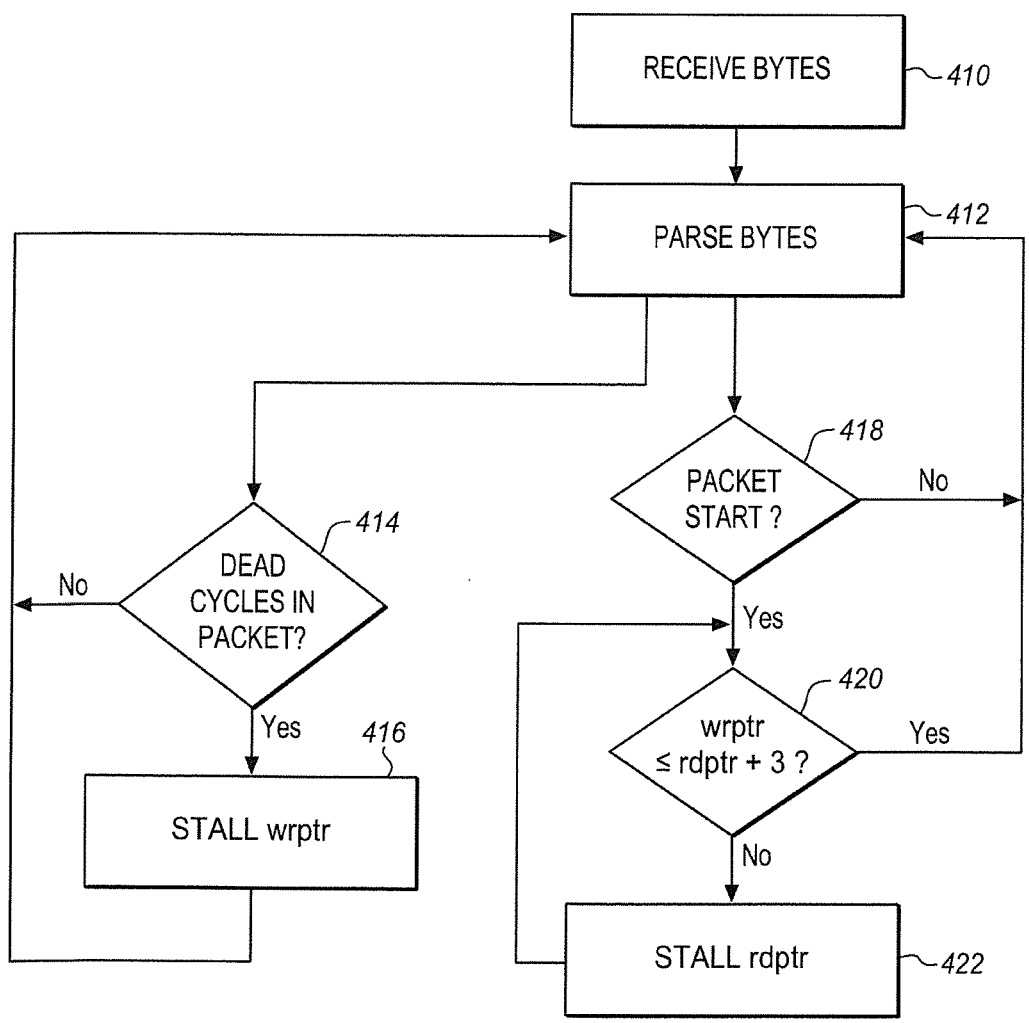
FIG. 4 is process flow diagram of removing upstream dead according to an embodiment of the invention.

FIG. 4 is a process flow diagram of the operation of the hardware of FIG. 3. At block 410, the parser receives bytes and at block 412 parses the bytes to determine whether at block 414 there are dead cycles in a packet. If there are dead cycles in the packet, then at 416 the parser generates a stall signal or the like to stall the writing of bytes into the buffer. This prevents the buffer from being filled with idle bits which, if read out to upstream equipment might cause difficulties in parsing the data. If the incoming bytes are not dead cycles, then the parser continues to parse the bytes as they are received.

At 418 the parser determines whether the parsed bytes represent the start of a packet. If not, then the parser continues to parse the bytes looking for the start of the packet or a dead cycle within the packet. In all of the examples described above, dead cycles that are not inside of a packet are ignored. This simplifies the operation of the system, however, the parser is also able to detect dead cycle bytes at any point in the received data. This can be replaced with buffered data or idle bytes, depending on the implementation. In addition, in the described examples, only TLP are described, however the same approach may be used with other types of packets that may incur a dead cycle.

If the symbol does not correspond to the start of a packet, such as a STP symbol, then the process returns to 412 to parse the symbols to detect further dead cycles and packets. Note further that the parser knows whether a dead cycle is inside a packet because it is also detecting STP packets. The parser may also detect symbols that indicate the end of a packet. For a TLP in PCIe, that symbol is the last LCRC symbol. Knowing the start and end of the packet allows the parser to determine whether the dead cycle has occurred between the start and the end of the packet.

At block 420, the parser determines how many clock cycles of data is stored in the buffer. This is done by comparing the read pointer to the write pointer. In the present example, if the read pointer is at least 3 clock cycles less than the write pointer, then the parser returns to parse symbols. On the other hand, if the read pointer is not enough lower than the write pointer, then the parser at block 422 stalls the read pointer so that the write pointer can catch up. The parser then test against to determine whether the write pointer is sufficiently ahead of the read pointer at block 420. If it is then the stall signal is de-asserted and the parser continues to parse symbols. At this stage, the parser is looking in particular for dead cycles or the end of the packet. However, the parser can also look for other types of symbols, depending on the particular implementation.

Figure 5:
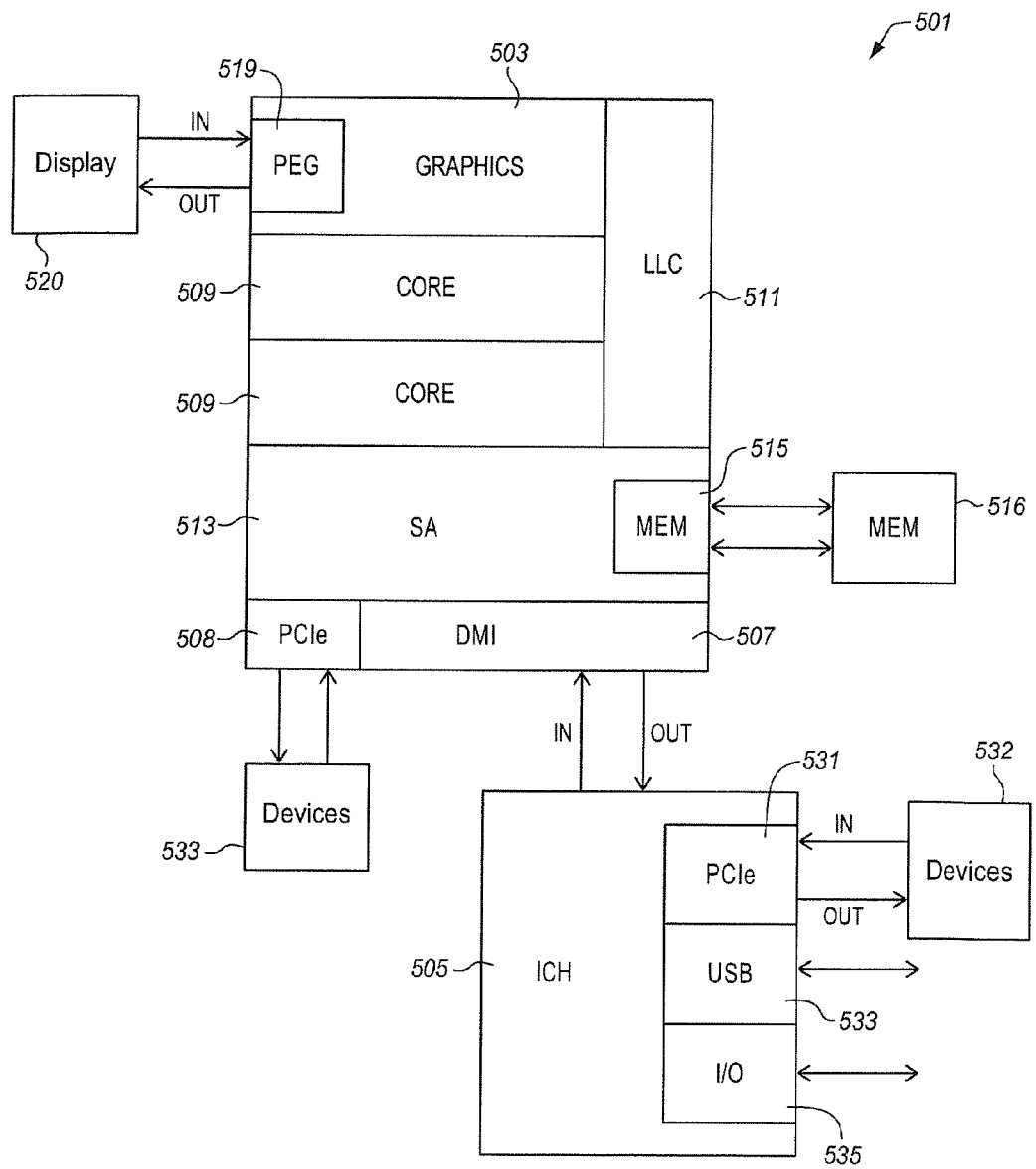
FIG. 5 is block diagram of a computer system suitable for implementing embodiments of the invention.

FIG. 5 is a computer system diagram showing PCIe interfaces and other similar interfaces that may benefit from the techniques and hardware discussed above. A computer system 501 has a CPU 503 coupled to an input/output controller hub (ICH) 505 through a DMI (Direct Media Interface) 507. The CPU has one or more cores for general purpose computing 509 coupled to the graphics core 503 and which share a Last Level Cache 511. The CPU includes system agents 513 such as a memory interface 515, and a PCIe graphics interface. In the illustrated example, the PCIe interface is for PCI express graphics and can be coupled to a graphics adapter or to a display 520, depending on the implementation. An additional PCIe interface 508 is provided in the CPU to be coupled to other PCIe devices and interfaces 533, such as high speed storage or communications. The memory interface 515 is to be coupled to system memory 516.

The input/output controller hub 505 includes interfaces 531 to additional PCIe devices 532, universal serial bus interfaces 533, and other external peripheral input/output interfaces 535. These interfaces are used for mass storage, displays, and user input/output devices, such as a keyboard and mouse. The input/output controller hub may also include a display interface and other additional interfaces.

The UDRs described above may be integrated into the PCIe interfaces in the CPU or the ICH or in any other desired location. In addition, they may be incorporated into the external devices 520, 532 that carry PCIe interfaces. Various other interfaces are also shown. If these also carry dead cycles within packets, then the approaches described above may also be applied to these interfaces.

A wide range of additional and alternative devices may be coupled to the computer system 501 shown in FIG. 5. Alternatively, the embodiments of the present invention may be adapted to different architectures and systems than those shown. Additional components may be incorporated into the existing units shown and more or fewer hardware components may be used to provide the functions described. One or more of the described functions may be deleted from the complete system.

It is to be appreciated that a lesser or more equipped system than the examples described above may be preferred for certain implementations. Therefore, the configuration of the exemplary systems and circuits may vary from implementation to implementation depending upon numerous factors, such as price constraints, performance requirements, technological improvements, or other circumstances.

Embodiments may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   receiving a sequence of bytes from at least one lane of a peripheral device bus, wherein the sequence of bytes combine to form packets, the packets including dead cycles and wherein each byte of the sequence of bytes is received in one of a sequence of clock cycles;
   identifying a byte of the sequence of bytes corresponding to the start of a packet;
   storing the byte corresponding to the start of the packet in a buffer;
   sending the byte corresponding to the start of the packet to a data link layer at least one clock cycle after it is received;
   identifying a dead cycle of the sequence of bytes received in a clock cycle after the start of the packet and before the end of the packet; and
   sending to the data link layer the byte corresponding to the clock cycle after the dead cycle during the clock cycle corresponding to the dead cycle.

2. The method of claim 1, further comprising:
   incrementing a read pointer at each clock cycle upon receiving each byte of the sequence; and
   stalling the read pointer until the next byte is received upon receiving a dead cycle.

3. The method of claim 2, wherein storing the byte comprises storing only bytes received when the read pointer is incremented.

4. The method of claim 2, further comprising:
   incrementing a write pointer at each clock cycle upon sending each byte of the sequence; and
   stalling the write pointer and sending idle bytes for at least one clock cycle upon receiving the byte corresponding to the start of the packet.

5. The method of claim 4, wherein sending the byte corresponding to the start of the packet comprises sending the byte corresponding to the start of the packet three clock cycles after the byte is received and wherein stalling the write pointer comprises stalling the write pointer until the write pointer is three clock cycles behind a read pointer, the read pointer being incremented with each received data byte.

6. The method of claim 4, further comprising resuming incrementing the write pointer upon receiving bytes of the packet and writing the received bytes into the buffer.

7. The method of claim 2, further comprising sending logical idle symbols in place of the data during the stalling.

8. The method of claim 1, wherein receiving a sequence of bytes comprises receiving data symbols on clock cycles from the lanes of the peripheral device bus.

9. The method of claim 1, wherein sending the byte at least one clock cycle after it is received comprises stalling sending the byte corresponding to the start of the packet until additional cycles of bytes are written into a buffer.

10. The method of claim 8 wherein receiving data symbols comprises receiving data symbols simultaneously on sixteen lanes of the peripheral device bus.

11. The method of claim 8, further comprising:
    incrementing a read pointer of the buffer upon sending a data symbol;
    incrementing a write pointer of the buffer upon writing a data symbol into the buffer; and
    wherein stalling sending the data symbols comprises stalling sending until the write pointer is a predetermined number of clock cycles ahead of the read pointer.

12. The method of claim 11, wherein the predetermined number corresponds to the maximum number of dead cycles that may occur in a packet.

13. A machine-readable non-transitory medium having instruction that when read by the machine cause the machine to perform operations comprising:
    receiving data symbols on clock cycles from lanes of a peripheral device bus having dead cycles;
    sending upstream the received data symbols on the clock cycles;
    detecting the start of a packet in the received data symbols;
    stalling sending the data symbols before sending the start of the packet until additional cycles of data are written into a buffer;
    sending logical idle symbols in place of the data during the stalling;
    sending the start of the packet upstream after the additional cycles of data are read into the buffer;
    detecting a dead cycle during the packet; and
    sending a buffered cycle of data upstream during the dead cycle.

14. The machine-readable medium of claim 13, further comprising:
    incrementing a write pointer on each cycle upon receiving a data symbol;
    stalling the write pointer and not writing dead cycle symbols into the buffer upon detecting a dead cycle.

15. The machine-readable medium of claim 13 further comprising:
    incrementing a read pointer of the buffer upon sending a data symbol;
    incrementing a write pointer of the buffer upon writing a data symbol into the buffer; and
    wherein stalling sending the data symbols comprises stalling sending until the write pointer is a predetermined number of clock cycles ahead of the read pointer.

16. An apparatus comprising:
    a plurality of physical lane units of a peripheral device interface bus to receive packets from a device, the packets comprising a clocked sequence of symbols including dead cycles;
    a buffer to store the received symbols in the clocked sequence;
    a symbol parser to determine that a symbol is a start of a packet and to generate a stall signal in response to determining a dead cycle;
    an input pass gate coupled to the symbol parser to write received symbols into the buffer in the clocked sequence, wherein the input pass gate stops writing to the buffer upon receiving the stall signal so that the determined dead cycles are not written to the buffer; and
    a read out pass gate to read symbols out of the buffer to upstream sinks, the read symbols not including dead cycles that were not written to the buffer.

17. The apparatus of claim 16, further comprising:
a buffer write pointer coupled to the input pass gate to write received symbols into the buffer in the clocked sequence;
a buffer read point coupled to the output pass gate to read symbols out of the buffer in the clocked sequence; and
a comparator coupled to the symbol parser, to the buffer write pointer, and to the buffer read pointer to compare the buffer read pointer to the buffer write pointer,
wherein the symbol parser stops the stall signal if the read pointer exceeds the write pointer by a predefined amount.

18. The apparatus of claim 17, wherein the predefined amount is 3 or more clock cycles.

19. The apparatus of claim 18, wherein the buffer read pointer and the buffer write pointer are both coupled to a single clock to increment on each clock cycle.

20. The apparatus of claim 16,
wherein the symbol parser determines that a symbol is a dead cycle and generates a stall signal to the buffer read pointer until the buffer has established a margin to allow for dead cycle stalls.

\* \* \* \* \*